US009727716B1

United States Patent

(12) United States Patent
Rodriguez Magana et al.

(10) Patent No.: US 9,727,716 B1
(45) Date of Patent: Aug. 8, 2017

(54) SHARED WORKSPACE ASSOCIATED WITH A VOICE-REQUEST ACCOUNT

(71) Applicant: X Development LLC, Mountain View, CA (US)

(72) Inventors: Daniel Rodriguez Magana, Mountain View, CA (US); Thomas Werner Finsterbusch, Mountain View, CA (US); Charles Chen, San Francisco, CA (US); Jason Samuel Soll, Stanford, CA (US); Thiago Teixeira, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 271 days.

(21) Appl. No.: 14/108,421

(22) Filed: Dec. 17, 2013

(51) Int. Cl.
*H04L 29/08* (2006.01)
*G06F 21/32* (2013.01)

(52) U.S. Cl.
CPC ........ *G06F 21/32* (2013.01); *H04L 29/08099* (2013.01); *H04L 67/025* (2013.01)

(58) Field of Classification Search
CPC ........ G06F 21/32
USPC ........ 726/19
See application file for complete search history.

(56) References Cited

U.S. PATENT DOCUMENTS 5,404,523 A * 4/1995 DellaFera ........ G06F 9/466 718/101
6,466,654 B1 * 10/2002 Cooper ........ G10L 15/26 379/88.01
7,120,928 B2 10/2006 Sheth et al.
7,177,916 B2 2/2007 McDonough et al.
8,086,508 B2 12/2011 Dheer et al.
8,265,862 B1 * 9/2012 Zilka ........ G01C 21/362 340/988
2004/0267535 A1 * 12/2004 Kotzin ........ G10L 15/30 704/275
2007/0128899 A1 * 6/2007 Mayer ........ G06F 9/4406 439/152
2007/0250833 A1 * 10/2007 Araujo, Jr. ........ G06F 21/6218 718/1
2007/0288572 A1 * 12/2007 Busa ........ G06Q 10/06 709/205
2008/0127355 A1 * 5/2008 Lorch ........ H04N 21/4435 726/29
2010/0205597 A1 * 8/2010 Bender ........ G06F 19/322 717/173

(Continued)

*Primary Examiner* — Matthew Henning
(74) *Attorney, Agent, or Firm* — McDonnell Boehnen Hulbert & Berghoff LLP

(57) ABSTRACT

Methods are described herein related to providing a workspace that is associated with a voice-request account workspace and that is capable of establishing a session for a user-account. An example method may involve: (a) providing, by a computing system, a workspace on a virtual machine, where the workspace is associated with a voice-request account, where the workspace is accessible to one or more guide computing systems, (b) receiving, at the computing system, authentication information for a user-account, (c) receiving, at the computing system, a request to establish a session for the user-account in the workspace associated with the voice-request account and responsively establishing the session, and (d) providing, by the computing system, the one or more guide accounts with access via the workspace to the session for the user-account.

23 Claims, 13 Drawing Sheets

(56) References Cited

U.S. PATENT DOCUMENTS

2010/0299763 A1 11/2010 Marcus et al.
2011/0161482 A1* 6/2011 Bonola ................. G06F 9/5077 709/223
2011/0244928 A1* 10/2011 Cherpes .............. H04M 3/5183 455/569.1
2012/0062357 A1* 3/2012 Slamka .................. G01C 21/20 340/4.11
2012/0147894 A1* 6/2012 Mulligan ............ G06F 9/45533 370/395.53
2012/0290460 A1* 11/2012 Curry, Jr. ............... G06Q 30/08 705/37
2013/0067549 A1 3/2013 Caldwell et al.
2013/0290856 A1* 10/2013 Beveridge ............. G06F 3/1454 715/740
2014/0032399 A1* 1/2014 Gonthier ................ G06Q 20/10 705/39
2014/0032759 A1* 1/2014 Barton .................... H04L 67/10 709/225

* cited by examiner

SHARED WORKSPACE ASSOCIATED WITH A VOICE-REQUEST ACCOUNT

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

As computing devices become smaller and more portable, traditional input devices such as keyboards, mice, and even touchscreens, may not be as feasible as they once were. As such, speech-based interfaces are becoming an increasingly popular way of allowing users to interact with their computing devices. Speech-based interfaces may be particularly useful on devices such as head-mountable displays (HMDs) and mobile phones, where other types of user-input devices and/or other modalities of user input may be limited, or may not even be feasible.

SUMMARY

Internet users may create password-protected online accounts with various entities and for various purposes. For example, users may create online user-accounts with e-mail service providers, online retailers, social networks, financial institutions, and so on. Example embodiments may relate to providing a workspace that is associated with a voice-request account and that may establish a session with one or more user-accounts to perform one or more actions associated with a given user-account. More specifically, example embodiments may be implemented in the context of a computing system, which is configured to permit a guide account to perform actions associated with the user-account in the workspace in response to a user's voice request. The voice request may be spoken to a user's computing device and then sent to a computing system or hybrid response system.

In one aspect, a method includes: (a) providing, by a computing system, a workspace on a virtual machine, wherein the workspace is associated with a voice-request account, wherein the workspace is accessible to one or more guide accounts, (b) receiving, at the computing system, authentication information for a user-account, (c) receiving, at the computing system, a request to establish a session for the user-account in the workspace associated with the voice-request account and responsively establishing the session, and (d) providing, by the computing system, the one or more guide accounts with access via the workspace to the session for the user-account.

In another aspect, a method includes: (a) sending, by a computing device associated with a voice-request account, a request to create a session for a user-account in a workspace for the voice-request account, (b) sending, by the computing device associated with the voice-request account, a request associated with the user-account, wherein the request is forwarded to a guide computing system that accesses the session via the workspace and executes an action on the user-account, and (c) receiving, by the computing device associated with the voice-request account, a notification that the action was executed.

In a further aspect, a non-transitory computer-readable medium is provided. The non-transitory computer readable medium is configured to store program instructions that, when executed by a processor, cause the processor to carry out functions comprising: (a) providing, by a computing system, a workspace on a virtual machine, wherein the workspace is associated with a voice-request account, wherein the workspace is accessible to one or more guide accounts, (b) receiving, at the computing system, authentication information for a user-account, (c) receiving, at the computing system, a request to establish a session for the user-account in the workspace associated with the voice-request account and responsively establishing the session, and (d) providing, by the computing system, the one or more guide accounts with access via the workspace to the session for the user-account.

Further example embodiments may include: (a) means for providing, by a computing system, a workspace on a virtual machine, wherein the workspace is associated with a voice-request account, wherein the workspace is accessible to one or more guide accounts, (b) means for receiving, at the computing system, authentication information for a user-account, (c) means for receiving, at the computing system, a request to establish a session for the user-account in the workspace associated with the voice-request account and responsively establishing the session, and (d) means for providing, by the computing system, the one or more guide accounts with access via the workspace to the session for the user-account These as well as other aspects, advantages, and alternatives will become apparent to those of ordinary skill in the art by reading the following detailed description, with reference where appropriate to the accompanying drawings.

DETAILED DESCRIPTION

Figure 1:
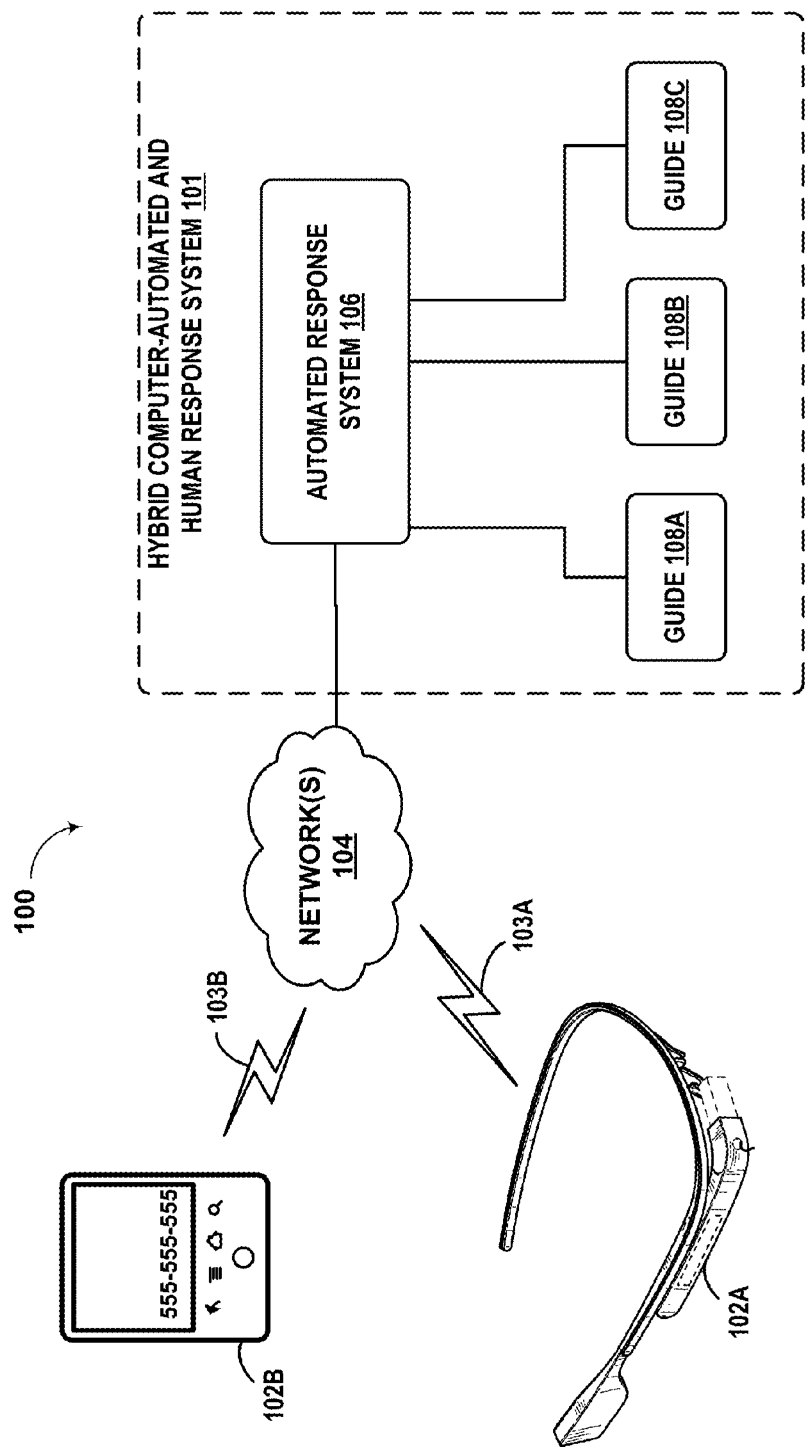
FIG. 1 is a block diagram illustrating components of a system, in which an example embodiment may be implemented.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Example methods involve a workspace on a virtual machine that is associated with a voice-request account. The workspace may be associated with a user's account with a hybrid response system (e.g., a voice-request account), and may be used to establish sessions for other associated user-accounts, such as user-accounts with e-mail service providers, online retailers, social networks, financial institutions, and so on. With a user's permission, the workspace may also be accessed by a guide account that is associated with a human guide to perform actions using one of the online user-accounts in response to a user request. The workspace allows a guide to act on behalf of a user via a guide account, in order to respond to or takes actions to fulfill a voice request associated with a user-account, where the user has given the guide appropriate permissions to do so.

In practice, a computing system that is part of or associated with a hybrid response system may provide a workspace on a virtual machine. A user may establish a session for one or more user-accounts by providing authentication data to a voice-request account associated with the hybrid response system. The authentication data may be provided to the voice-request account via a browser extension, for example. With the user's permission, the computing system may then receive a request to establish a session for a given user-account in the workspace and responsively establish a session.

Once a session for a user-account is established on the workspace, a user may utter a voice request to a computing device that is associated with the voice-request account. The computing device then sends the voice request to perform an action on the user-account. The voice-request account and/or the hybrid response system may then determine whether the process of determining and providing a response to the request may be automated or requires human assistance. If human assistance is required, the computing system then provides the one or more guide accounts with access via the workspace to the pre-established session for the user-account. With the user's permission, an action associated with the user-account may then be executed by the guide account via the workspace. Example actions that the user may request include posting a status update or photos on a social network account, purchasing goods or services from an online retailer, or making on-line reservations, sending messages or emails via an email account or a social network account, checking account balances or making credit card payments, among other possibilities.

In addition, a user may manage or grant permissions and/or restrictions for a given user-account via the voice-request account. A user may provide these permissions and restrictions to the voice-request account via a browser extension, for example. The permissions and restrictions determine the degree of access that a guide account has once a session has been established for a user-account in the workspace. For example, with the user's permission, the guide account may be able to post status updates on a social networking account but may be restricted from access to a user's photos, friends or contacts or messages associated with the same social networking account. In another example, with the user's permission, a guide account may be able to send emails from a user's email account but may be restricted from accessing the user's inbox, sent folder or other archived folders. In a further example, with a user's permission, a guide account may have access to past purchases and the ability to make additional purchases via a user-account with an online retailer but may be restricted from viewing stored credit card information associated with the same account. Alternatively, a user may grant a guide account full access to a user-account, such as an online restaurant reservation account.

One benefit of utilizing the workspace to access the user's online accounts is that actions executed during the user session on the workspace may provide a user with reward points for purchases, reservations, etc. associated with those user-accounts. Specifically, the user's voice-request account with the hybrid response system may be linked, with the user's permission, to reward accounts and/or accounts for similar types of programs, so that rewards for actions taken through the hybrid response system or an associated guide account may be credited to the associated reward account.

In a further aspect of some embodiments, the user's computing device may receive a signal and responsively display a real-time stream of the workspace. The real-time display may help to maintain data integrity and security of the system as a means for the user to audit the actions made via the guide account. Further, the guide account may access a user's computing device, similar to remote desktop, to establish the session with the user-account and execute the requested action. Alternatively, a user interface that is displayed to a user may be different than a user interface displayed on the workspace to the guide account. The interface displayed to the user is designed for ease of use on the front-end, while the user interface on the workspace is designed for a trained back-end user of a guide account.

II. HYBRID COMPUTER-AUTOMATED AND HUMAN RESPONSE SYSTEMS

FIG. 1 is a block diagram illustrating components of a system 100, in which an example embodiment may be implemented. System 100 includes a Hybrid Computer-Automated and Human Response System 101 (which may be referred to simply as a "hybrid response system"), client devices 102A and 102B, and one or more communication networks 104.

A client device such as client device 102A or 102B may take various forms, such as a mobile phone, a tablet computer, laptop computer, a desktop computer, or a wearable computer, among other possibilities. In the illustrated example, client device 102A is a head-mountable device (HMD), and client device 102B is a smartphone. Further, client devices 102A and 102B may be configured to communicate with other devices via one or more communication networks 104 via respective communication links 103A and 103B.

Provided with network connectivity, a client device 102A or 102B may communicate with a hybrid response system 101. Further, client devices 102A and 102B may each be configured to receive voice input, and to generate or extract speech segments from the voice input. Further, client devices 102A and 102B may send speech-segment messages, which include such speech segments, to hybrid response system 101 via one or more networks 104, such as the Internet, a cellular network, and/or a service provider's network.

Note that herein, the term "speech segment" may refer to an audio segment that includes speech by a user of a client device 102A or 102B, or to the speech-to-text transcription of such speech, or possibly to a combination of an audio segment with speech and a speech-to-text transcription of such speech. Thus, a speech-segment message may be any message that includes a speech segment (in audio and/or text format). Various types of speech-segment messages are possible. For example, a speech-segment message sent by a client device to the hybrid response system may take the form of a potentially actionable-speech message, or could take other forms. As such, a potentially actionable-speech message may include an audio segment that includes speech by a user of a client device 102A or 102B, and/or may include a speech-to-text transcription of the speech in such an audio segment. A potentially-actionable-speech message may also include other information, such as context information related to the client device and/or a user-account that is currently associated with the client device, for instance.

A client device 102A or 102B may provide various interface features that allow a user to interact with a hybrid response system 101. For instance, HMD 102A may allow a user to provide an explicit indication that the user is about to provide speech that should be sent to the hybrid response system 101 in a speech-segment message, such as in a potentially actionable-speech message. As an example, when the user taps and holds a touchpad on HMD 102A, and subsequently speaks, the subsequent speech may be captured as a speech segment and sent to the hybrid response system in a potentially actionable-speech message. Note that in this example, the HMD 102A may be configured to record speech after the user removes their finger from the touchpad, or may capture speech that occurs while still the user holds their finger on the touchpad. Client devices 102A and 102B may also be configured to detect speech segments for potentially actionable-speech messages without explicit input from the user; for example, by detecting words, a phrase, or phrases in speech that are deemed to be potentially actionable.

In an example embodiment, the components of hybrid response system 101 include an automated response system 106 and guide computing systems 108A to 108C. Hybrid response system 101 and/or the components thereof may be implemented in one or more computing clusters that are associated with an information-provider service. For example, the automated response system 106 may include one or more computing systems that are configured to receive speech-segment messages that are sent by client devices, and to analyze and potentially respond to such messages.

In a further aspect, automated response system 106 may apply one or more machine-learning response processes to a speech segment, in order to determine one or more potential responses to the speech segment. (Note that a machine-learning process may also be referred to as an artificial intelligence (AI) process.) A potential response that is generated by such an AI response process may be considered an "automated" response, since it is generated by a computing system, without the assistance of human input. Note that other automated processes, which do not involve AI or machine-learning, are also possible.

Automated response system 106 may be further configured to determine a confidence measure for each potential response that is generated by an automated response process. Further, automated response system 106 may be configured to determine if the confidence measure for a potential response satisfies certain criteria (e.g., exceeds a threshold) and, if the criteria are satisfied, to select the potential response as a response to the speech-segment message. Further, when there is acceptable confidence in an automated response, automated response system 106 may be configured to send the automated response to the client device 102A or 102B from which the corresponding speech-segment message was received.

If automated response system 106 cannot determine an automated response to a speech-segment message with an acceptable level of confidence, then automated response system 106 may be configured to send the speech-segment message, and/or a message containing information derived therefrom, to one or more guide computing systems 108A to 108C. Note that automated response system 106 and guide computing systems 108A to 108C may be part of a service provider's network, and may communicatively connected via wired or wireless links. Alternatively, some or all guide computing systems 108A to 108C may not be part of the service provider's network. For example, third party individuals who are pre-qualified as guides may connect to automated response system 106 via their home computers. In such an embodiment, automated response system 106 and guide computing systems 108A to 108C may communicate via one or more networks 104, such as the Internet and/or a cellular network.

Each guide computing system 108A to 108C may provide an interface via which a human can provide input. Such human input may be used to generate a response to a speech-segment message that was sent from a client device 102A or 102B.

For example, a guide computing system 108A to 108C may include or be connected to a graphic display on which the guide computing system can display a graphical user interface (GUI) that facilitates a human-assisted response to a speech-segment message. Such a GUI may include the text of a speech segment and/or other information that may facilitate taking an action related to the speech segment. The GUI may include features that prompt and/or receive human input, such as text and/or speech, via which a human guide can provide a response and/or information that may be used to generate a response. The GUI may also include interactive features (e.g., buttons, check boxes, drop-down menus, etc.) via which a human guide can provide a response and/or information that may be used to generate a response. Further, the GUI may include an interactive feature or features via which a human guide can indicate that a response is acceptable and should be sent to the client device 102A or 102B.

In some embodiments, the GUI may include a feature or features that provide a guide with context information that a user has elected to make available via a user-account with the hybrid response system 101. For example, if a user has consented to use of certain information by the hybrid response system 101 (and associated human guides), such as location information, calendar information, contact information, information related to past interactions with contacts, and/or past use of certain applications, such information may selectively provided in the GUI when the user sends a speech-segment message from their client device, in order to assist a guide in providing a personalized response.

Further, in some cases, a user may link other user-accounts to the user's account with the hybrid response system 101. For example, a user could link their email accounts, social-network accounts, and/or other types of user-accounts, to their user-account with the hybrid response system 101. In this scenario, a user may elect to allow full or partial access to such accounts to the hybrid response system (and possibly to associated human guides as well). If the user elects to provide access to such a linked account, then the GUI may include information obtained via the linked user-account, and/or may include a feature that allows a guide to access the linked user-account.

Generally, note that in situations where the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In a further aspect of some embodiments, a guide computing system 108A to 108C may provide a GUI or another type of interface via which a human guide can send a communication to and/or establish a communication session with a client device 102A or 102B to which the guide is providing a response. For example, a guide computing system 108A to 108C may include an interface that allows a human guide to initiate a phone call to a client device 102A or 102B, initiate and/or engage in a text-based chat session with a client device 102A or 102B, send a text message (e.g., an SMS or MMS message) to a client device 102A or 102B, and/or send an e-mail to a client device, among other possibilities. Provided with such an interface, a guide may send a message or initiate a communication session to, e.g., request additional information to facilitate and/or improve the quality of a response.

In the illustrated example, communication links 103A and 103B are wireless links. For example, a client device 102A or 102B may establish and communicate via a respective communication link 103A or 103B using a wireless communication protocol, such as Bluetooth® radio technology, communication protocols described in IEEE 802.11 (including any IEEE 802.11 revisions), and/or cellular communication protocols (such as GSM, CDMA, UMTS, EV-DO, WiMAX, or LTE), among other possibilities. Note, however, that a client device 102A or 102B may additionally or alternatively be configured for network communications over one or more wired connections. For example, a communication link 103A or 103B may be a wired serial bus such as a universal serial bus or a parallel bus. A wired connection may be a proprietary connection as well, or may take other forms.

Variations on the system 100 illustrated in FIG. 1, and/or variations on the functionality attributed to components of system 100, are possible. For instance, multiple components may be combined in the same entity. As an example, a system may include more or less guide computing systems than shown in FIG. 1. Further, any component that is illustrated in FIG. 1 may be divided into two or more components that collectively provide the described functionality. Other variations from the illustrated examples are also possible.

Figure 2:
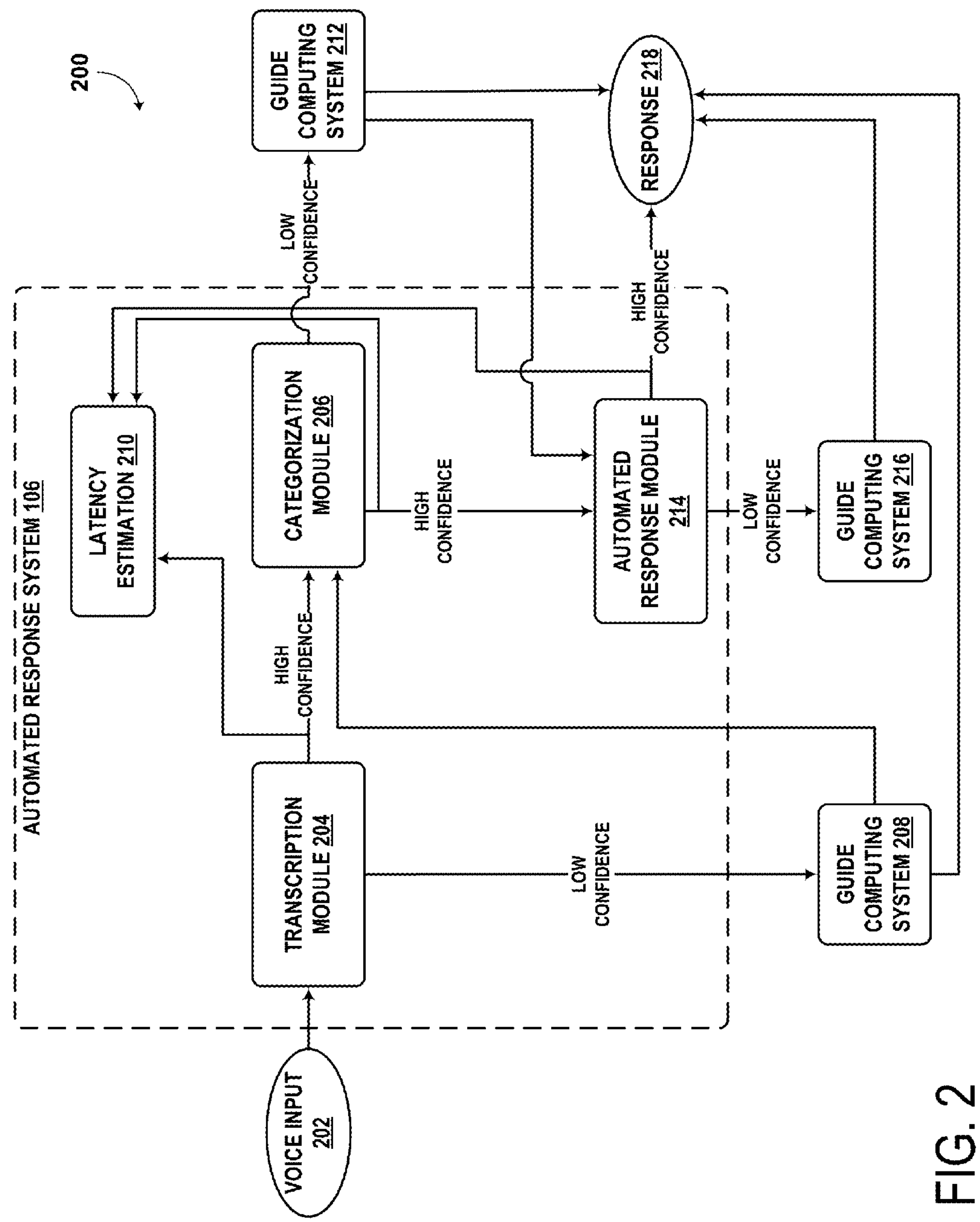
FIG. 2 is a block diagram showing functional components of a system, according to an example embodiment.

FIG. 2 is a block diagram showing functional components of a system 200, according to an example embodiment. Collectively, the components of system 200 may function to receive voice input (e.g., a speech segment), and to provide either an automated response or a human-assisted response to the question.

More specifically, voice input 202 may be received by a transcription module 204, which applies a speech-to-text process to generate text corresponding to the voice input 202. Further, transcription module 204 may analyze whether the corresponding text is an accurate transcription of the voice input 202. In particular, the transcription module 204 may determine a translation confidence measure that indicates how likely it is that the corresponding text is an accurate transcription. If the translation confidence measure exceeds a threshold, then the transcription module 204 may send the generated text to a categorization module 206. If the translation confidence measure is lower (e.g., less than a threshold), then the transcription module 204 may send the text (and possibly audio data that includes some or all of the voice input 202) to a guide computing system 208. Further, in some embodiments, if the confidence measure is very low (e.g., indicative of audio that does not include human speech), the transcription module 204 may discard the text without taking any further action.

The guide computing system 208 may provide an interface that facilitates evaluation of the generated text by a human guide. In particular, such an interface may allow a human guide to indicate whether or not the text is an accurate translation. Further, such an interface may allow the guide to edit the text such that it is more accurate transcription of the voice input. In the event that a human guide indicates that the text is an accurate transcription, and/or edits the text such that it is an accurate transcription, the guide computing system 208 may send the text to categorization module 206. Additionally or alternatively, and regardless of whether the text is an accurate transcription, the guide computing system 208 may provide an interface that allows the human guide to indicate that the text does not include a question to which a response can be provided, and thus should be discarded instead of being sent to categorization module 206.

The transcription module 204 or the guide computing system 208 may thus be the component that outputs a potentially actionable-speech message in which the speech segment includes text (and possibly an audio version of the text as well). As such, the transcription module could be implemented at a client device, or could be implemented as part of a service-provider's system. Alternatively, if the transcription module 204 is implemented as part of a service provider's network, the transcription module may receive and analyze a potentially actionable-speech message that is sent from a client device. Further, the potentially actionable-speech message may be sent to the categorization module 206 for further evaluation.

Categorization module 206 may analyze whether the received text includes speech to which a response can be provided (e.g., whether the speech segment is, in fact, "actionable"). In particular, the categorization module 206 may determine an actionable-speech confidence measure that indicates how likely it is that the text constitutes a question, a command, a request, or another type of message that is actionable. If the actionable-speech confidence measure exceeds a threshold, then the categorization module 206 may generate a speech-segment message that may be referred to as an actionable-speech message, which includes some or all of the text, and send the actionable-speech message to an automated response module 214.

Note that actionable speech segments may take various forms. For example, an actionable speech segment may be a question, such as "where can I get lunch right now?" An actionable speech segment could also be a command or an instructions, such as "buy those shoes for me." An actionable speech segment may take other forms as well. Further, while an actionable speech segment could make the desired response explicit, responsive actions may also be inferred from the speech segment and/or context information related to the client device and/or user-account associated with the speech segment.

In a further aspect, categorization module 206 may classify an actionable-speech message in various ways. For instance, categorization module 206 may determine that a speech segment is of a particular type, relates to certain topic, and/or that providing a response to a speech segment in the message has a certain difficulty level, among other possibilities. Accordingly, such classifications may be indicated in an actionable-speech message that is sent to automated response module 214.

If the actionable-speech confidence measure is lower (e.g., less than a threshold), then the categorization module 206 may send the generated text to a guide computing system 212. The guide computing system 212 may provide an interface that facilitates evaluation of the text by a human guide. In particular, the guide computing system 212 may provide an interface via which a human guide can indicate whether or not the text includes a question, and possibly edit the question such that it is more understandable. Further, the guide computing system 212 may provide an interface for classifying actionable speech segments in the same or a similar manner as a categorization module 206. Alternatively, once a human guide indicates that the text is actionable, the guide computing system 212 may send the text back to the categorization module 206, which may classify the speech segment and/or generate and send an actionable-speech message to automated response module 214.

Automated response module 214 may function to apply one or more automated processes to a given actionable-speech message, such as AI or machine-learning processes. Each automated process may output a response to the actionable-speech message, and a confidence score (i.e., a measure of confidence) indicating a confidence that the response is correct. If the confidence score for a response from one AI process is above a threshold at which the response is considered to be correct (e.g., greater than 99% confidence in the response), then this automated response may be selected as the response to the question, and sent to the corresponding client device.

Note that in some cases, there may be multiple responses having a confidence score that is above the threshold where the response is considered to be correct. In this scenario, one of the "correct" responses may be selected and sent to the client device. For example, the correct response having the highest confidence score may be selected, or one of the correct responses may be selected at random. As another example, automated response module 214 may send some or all of the correct responses to a guide computing system 216 for evaluation by a human guide, who can then select one correct response. Other techniques for selecting a response from multiple correct responses are possible.

If no automated response to an actionable-speech message has a confidence score above the threshold for a "correct" response, then automated response module 214 may forward the actionable-speech message to a guide computing system 216. The guide computing system 216 may present the speech segment from the actionable-speech message and/or other information included in or derived from the actionable-speech message to a human guide. Further, guide computing system 216 may provide an interface that allows a human guide to indicate a response, provide information from which a response may be generated, and/or initiate a responsive action.

In some embodiments, automated response module 214 may evaluate the confidence score or scores for automated responses in a more granular way. For instance, automated response module 214 may classify responses with one of three confidence levels: a high-confidence level (e.g., greater than 99% confidence), a medium-confidence level (e.g., 80-98% confidence), and a low-confidence level (e.g., less than 80%). If one or more automated responses are categorized as high-confidence responses, then automated response module 214 may initiated an automated response.

If there is no high-confidence automated response, then the information that is sent to the guide computing system may vary depending upon the confidence level or levels of the automated responses. For example, if all the automated responses have a low confidence level, then automated response module 214 may simply send the actionable-speech message to a guide computing system 216. However, if some or all of the automated responses have a medium-confidence level, then automated response module 214 may send the actionable-speech message and the medium-confidence responses to the guide computing system 216. The guide computing system 216 may then provide an interface that allows a human guide to quickly select one of the medium-confidence responses as the correct response. Such an interface may also include features that allow a guide to provide a response as they otherwise would, if the guide believes that none of the medium-confidence responses are correct.

Note that the feature of forwarding automated responses to guide computing systems may be applied in implementations other than those described above. In particular, when automated response module 214 determines that a guide computing system 216 should make the ultimate decision as to the correct response, automated response module 214 may send any response that was determined by one of its AI processes to the guide computing system 216 for consideration by a human guide. In order to facilitate a quicker response, automated response module 214 may limit the number of automated responses that are sent to the guide computing system 216 for consideration. However, automated response module 214 could theoretically send any number of automated responses to a guide computing system 216 for consideration.

Note that a response 218 may take various forms. For example, response 218 may be content that is sent to a client device associated with the actionable-speech message. Such a response 218 may include text, hyperlinks, graphic content, and/or other types of information that can be presented on a client device. A response 218 may also be a responsive action. For example, an AI process or guide computing system may response to an actionable-speech message by purchasing items via an associated user-account, or posting a message via an associated account on a social network (presuming, in both cases, that the user has authorized such functionality). Other examples of responsive actions are also possible. Further, note that depending upon a user's settings, the user may or may not be notified explicitly (e.g., via e-mail or text message) of such responsive actions.

In a further aspect, automated response module 214 may receive feedback from guide computing systems 208, 212 and/or 216, which may be used to improve the AI processes that are applied to incoming actionable-speech messages. Machine learning processes may then be applied to such feedback, so that the AI processes may improve over time. Note that as such AI processes improve, this may free up human guides to respond to more and more complex questions.

Automated response module 214 may use various types of feedback to improve the one or more AI processes that are applied to incoming actionable-speech messages. For example, when an actionable-speech message is sent to a guide computing system 216, automated response module may be informed of the human-assisted response that was sent to the client device and/or the steps that the human took to determine the response. As another example, each time an automated response is sent to a guide computing system 216 for consideration, automated response module 214 may be informed as to whether or not the automated response was selected as the correct response. As yet another example, when a client device receives an automated response from automated response module 214 or a human-assisted response from guide computing system 216, the client device may send feedback indicating the quality of the response. For instance, feedback from a client device may indicate whether the response provided information they needed, whether or not the response was correct, whether a better response could have been provided, and/or information that might improve future responses to similar questions, among other possibilities.

In a further aspect, system 200 may include a latency estimation module 210. The latency estimation module 210 may evaluate questions and estimate how long it will take for a response to be provided to a client device. Latency estimation module 210 may therefore be configured to send an estimated-response-time message to a client device that is awaiting the response. The estimated-response-time message may indicate an estimated period of time (e.g., 30 seconds) until the client device will receive a response to a question that was sent from the client device. Further, while a client device is awaiting a response, latency estimation module 210 may update the estimated response time, and send estimated-response-time message indicating such updates, as new information is received.

In order to estimate and/or update the estimated response time, latency estimation module 210 may receive information from transcription module 204, categorization module 206, automated response module 214, guide computing systems, and/or other sources. For example, latency estimation module 210 may increase or decrease an estimated response time for a actionable-speech message depending on: (a) whether the transcription module 204 has a lower or higher confidence in a transcription, respectively, (b) whether the categorization module 206 has a higher or lower confidence that the received text is actionable, (c) the complexity of the speech segment and/or the type or category of speech segment (e.g., as determined by categorization module 206), and/or (d) whether or not automated response module can provide an automated response with a high enough level of confidence, among other possibilities.

Note that some or all of guide computing systems 208, 212, 216 may be the same guide computing system. Alternatively, different guide computing systems may be utilized for some or all of the guide computing systems that may be involved in providing a response to a particular actionable-speech message.

Further, in some embodiments, all of the modules shown in FIG. 2 may be part of an automated response system 106. In other embodiments, some of the modules shown in FIG. 2 may be implemented at a client device 102A or 102B. For example, transcription module 204 and/or categorization module 206 may be implemented by a client device. Other examples are also possible.

III. EXAMPLE WEARABLE COMPUTING DEVICES

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

Figure 3A:
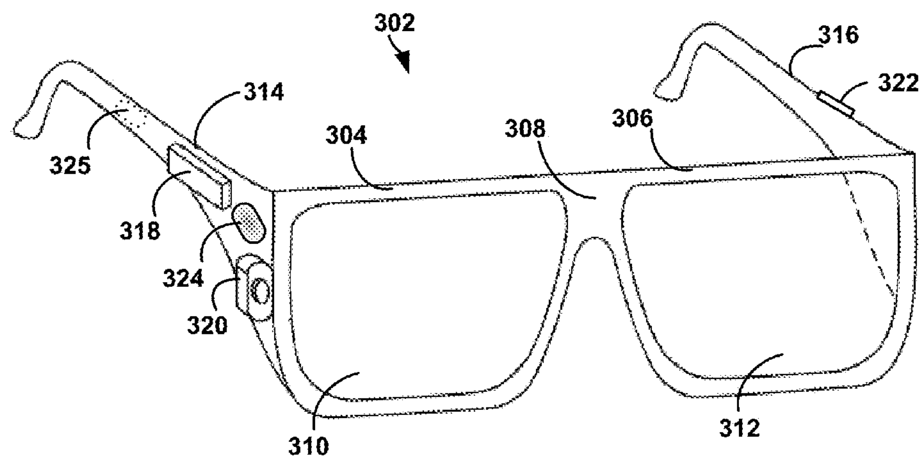
FIG. 3A illustrates a wearable computing system according to an example embodiment.

FIG. 3A illustrates a wearable computing system according to an example embodiment. In FIG. 3A, the wearable computing system takes the form of a head-mountable device (HMD) 302 (which may also be referred to as a head-mounted display). It should be understood, however, that example systems and devices may take the form of or be implemented within or in association with other types of devices, without departing from the scope of the invention. As illustrated in FIG. 3A, the HMD 302 includes frame elements including lens-frames 304, 306 and a center frame support 308, lens elements 310, 312, and extending side-arms 314, 316. The center frame support 308 and the extending side-arms 314, 316 are configured to secure the HMD 302 to a user's face via a user's nose and ears, respectively.

Each of the frame elements 304, 306, and 108 and the extending side-arms 314, 316 may be formed of a solid structure of plastic and/or metal, or may be formed of a hollow structure of similar material so as to allow wiring and component interconnects to be internally routed through the HMD 302. Other materials may be possible as well.

One or more of each of the lens elements 310, 312 may be formed of any material that can suitably display a projected image or graphic. Each of the lens elements 310, 312 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 314, 316 may each be projections that extend away from the lens-frames 304, 306, respectively, and may be positioned behind a user's ears to secure the HMD 302 to the user. The extending side-arms 314, 316 may further secure the HMD 302 to the user by extending around a rear portion of the user's head. Additionally or alternatively, for example, the HMD 302 may connect to or be affixed within a head-mounted helmet structure. Other configurations for an HMD are also possible.

The HMD 302 may also include an on-board computing system 318, an image capture device 320, a sensor 322, and a finger-operable touch pad 324. The on-board computing system 318 is shown to be positioned on the extending side-arm 314 of the HMD 302; however, the on-board computing system 318 may be provided on other parts of the HMD 302 or may be positioned remote from the HMD 302 (e.g., the on-board computing system 318 could be wire- or wirelessly-connected to the HMD 302). The on-board computing system 318 may include a processor and memory, for example. The on-board computing system 318 may be configured to receive and analyze data from the image capture device 320 and the finger-operable touch pad 324 (and possibly from other sensory devices, user interfaces, or both) and generate images for output by the lens elements 310 and 312.

The image capture device 320 may be, for example, a camera that is configured to capture still images and/or to capture video. In the illustrated configuration, image capture device 320 is positioned on the extending side-arm 314 of the HMD 302; however, the image capture device 320 may be provided on other parts of the HMD 302. The image capture device 320 may be configured to capture images at various resolutions or at different frame rates. Many image capture devices with a small form-factor, such as the cameras used in mobile phones or webcams, for example, may be incorporated into an example of the HMD 302.

Further, although FIG. 3A illustrates one image capture device 320, more image capture device may be used, and each may be configured to capture the same view, or to capture different views. For example, the image capture device 320 may be forward facing to capture at least a portion of the real-world view perceived by the user. This forward facing image captured by the image capture device 320 may then be used to generate an augmented reality where computer generated images appear to interact with or overlay the real-world view perceived by the user.

The sensor 322 is shown on the extending side-arm 316 of the HMD 302; however, the sensor 322 may be positioned on other parts of the HMD 302. For illustrative purposes, only one sensor 322 is shown. However, in an example embodiment, the HMD 302 may include multiple sensors. For example, an HMD 302 may include sensors 302 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 324 is shown on the extending side-arm 314 of the HMD 302. However, the finger-operable touch pad 324 may be positioned on other parts of the HMD 302. Also, more than one finger-operable touch pad may be present on the HMD 302. The finger-operable touch pad 324 may be used by a user to input commands. The finger-operable touch pad 324 may sense at least one of a pressure, position and/or a movement of one or more fingers via capacitive sensing, resistance sensing, or a surface acoustic wave process, among other possibilities. The finger-operable touch pad 324 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 324 may be formed of one or more translucent or transparent insulating layers and one or more translucent or transparent conducting layers. Edges of the finger-operable touch pad 324 may be formed to have a raised, indented, or roughened surface, so as to provide tactile feedback to a user when the user's finger reaches the edge, or other area, of the finger-operable touch pad 324. If more than one finger-operable touch pad is present, each finger-operable touch pad may be operated independently, and may provide a different function.

In a further aspect, HMD 302 may be configured to receive user input in various ways, in addition or in the alternative to user input received via finger-operable touch pad 324. For example, on-board computing system 318 may implement a speech-to-text process and utilize a syntax that maps certain spoken commands to certain actions. In addition, HMD 302 may include one or more microphones via which a wearer's speech may be captured. Configured as such, HMD 302 may be operable to detect spoken commands and carry out various computing functions that correspond to the spoken commands.

As another example, HMD 302 may interpret certain head-movements as user input. For example, when HMD 302 is worn, HMD 302 may use one or more gyroscopes and/or one or more accelerometers to detect head movement. The HMD 302 may then interpret certain head-movements as being user input, such as nodding, or looking up, down, left, or right. An HMD 302 could also pan or scroll through graphics in a display according to movement. Other types of actions may also be mapped to head movement.

As yet another example, HMD 302 may interpret certain gestures (e.g., by a wearer's hand or hands) as user input. For example, HMD 302 may capture hand movements by analyzing image data from image capture device 320, and initiate actions that are defined as corresponding to certain hand movements.

As a further example, HMD 302 may interpret eye movement as user input. In particular, HMD 302 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 302 also includes a speaker 325 for generating audio output. In one example, the speaker could be in the form of a bone conduction speaker, also referred to as a bone conduction transducer (BCT). Speaker 325 may be, for example, a vibration transducer or an electroacoustic transducer that produces sound in response to an electrical audio signal input. The frame of HMD 302 may be designed such that when a user wears HMD 302, the speaker 325 contacts the wearer. Alternatively, speaker 325 may be embedded within the frame of HMD 302 and positioned such that, when the HMD 302 is worn, speaker 325 vibrates a portion of the frame that contacts the wearer. In either case, HMD 302 may be configured to send an audio signal to speaker 325, so that vibration of the speaker may be directly or indirectly transferred to the bone structure of the wearer. When the vibrations travel through the bone structure to the bones in the middle ear of the wearer, the wearer can interpret the vibrations provided by BCT 325 as sounds.

Various types of bone-conduction transducers (BCTs) may be implemented, depending upon the particular implementation. Generally, any component that is arranged to vibrate the HMD 302 may be incorporated as a vibration transducer. Yet further it should be understood that an HMD 302 may include a single speaker 325 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 325 can vibrate the wearer's bone structure.

Figure 3B:
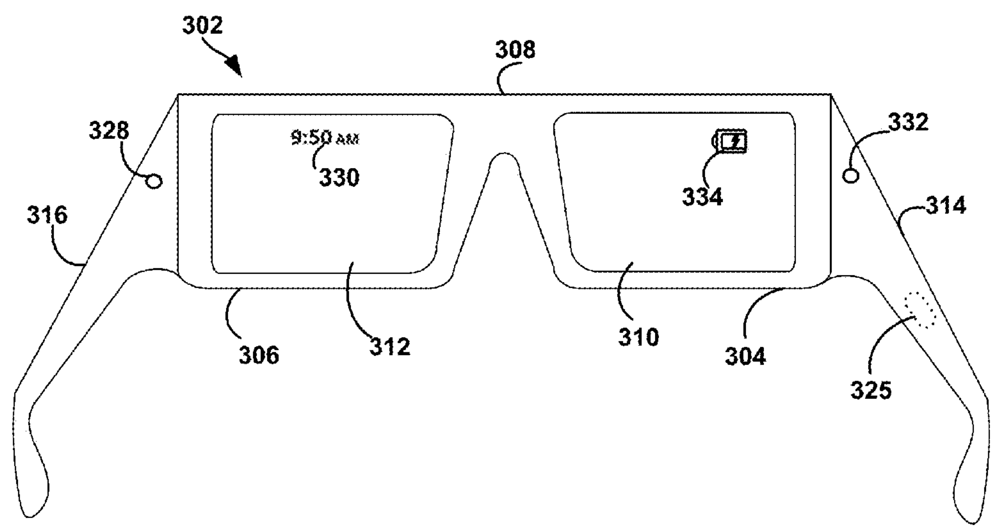
FIG. 3B illustrates an alternate view of the wearable computing device illustrated in FIG. 3A.

FIG. 3B illustrates an alternate view of the wearable computing device illustrated in FIG. 3A. As shown in FIG. 3B, the lens elements 310, 312 may act as display elements. The HMD 302 may include a first projector 328 coupled to an inside surface of the extending side-arm 316 and configured to project a display 330 onto an inside surface of the lens element 312. Additionally or alternatively, a second projector 332 may be coupled to an inside surface of the extending side-arm 314 and configured to project a display 334 onto an inside surface of the lens element 310.

The lens elements 310, 312 may act as a combiner in a light projection system and may include a coating that reflects the light projected onto them from the projectors 328, 332. In some embodiments, a reflective coating may not be used (e.g., when the projectors 328, 332 are scanning laser devices).

In alternative embodiments, other types of display elements may also be used. For example, the lens elements 310, 312 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 304, 306 for driving such a matrix display. Alternatively or additionally, a laser or LED source and scanning system could be used to draw a raster display directly onto the retina of one or more of the user's eyes. Other possibilities exist as well.

Figure 3C:
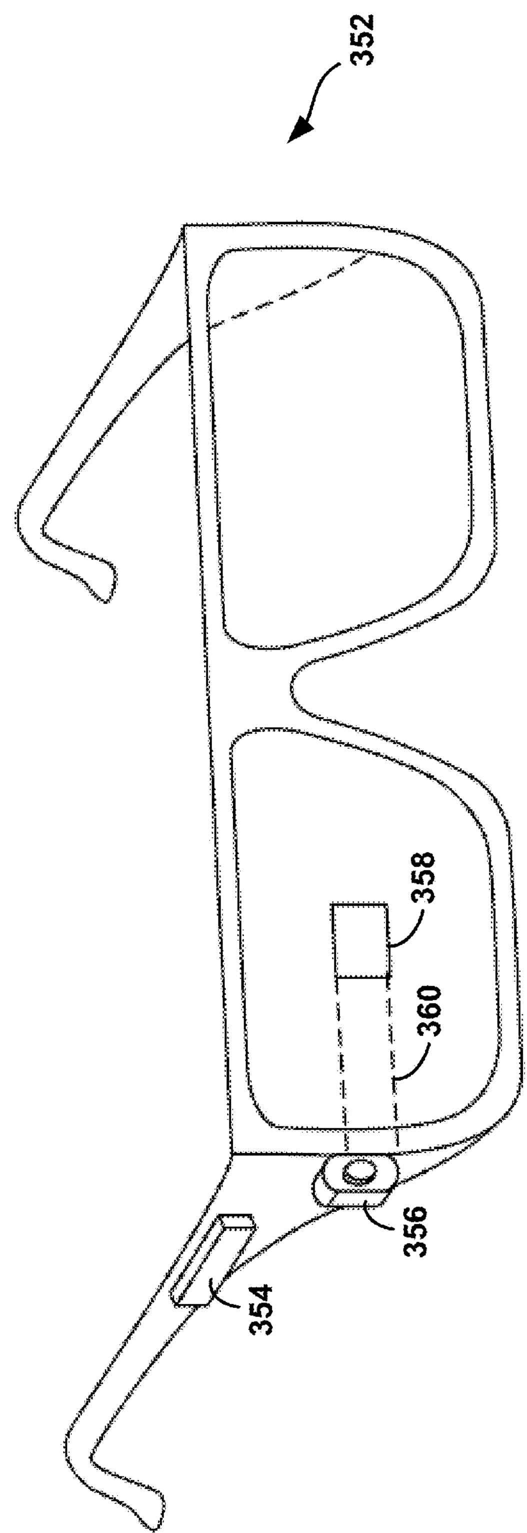
FIG. 3C illustrates another wearable computing system according to an example embodiment.

FIG. 3C illustrates another wearable computing system according to an example embodiment, which takes the form of an HMD 352. The HMD 352 may include frame elements and side-arms such as those described with respect to FIGS. 3A and 3B. The HMD 352 may additionally include an on-board computing system 354 and an image capture device 356, such as those described with respect to FIGS. 3A and 3B. The image capture device 356 is shown mounted on a frame of the HMD 352. However, the image capture device 356 may be mounted at other positions as well.

As shown in FIG. 3C, the HMD 352 may include a single display 358 which may be coupled to the device. The display 358 may be formed on one of the lens elements of the HMD 352, such as a lens element described with respect to FIGS. 3A and 3B, and may be configured to overlay computer-generated graphics in the user's view of the physical world. The display 358 is shown to be provided in a center of a lens of the HMD 352, however, the display 358 may be provided in other positions, such as for example towards either the upper or lower portions of the wearer's field of view. The display 358 is controllable via the computing system 354 that is coupled to the display 358 via an optical waveguide 360.

Figure 3D:
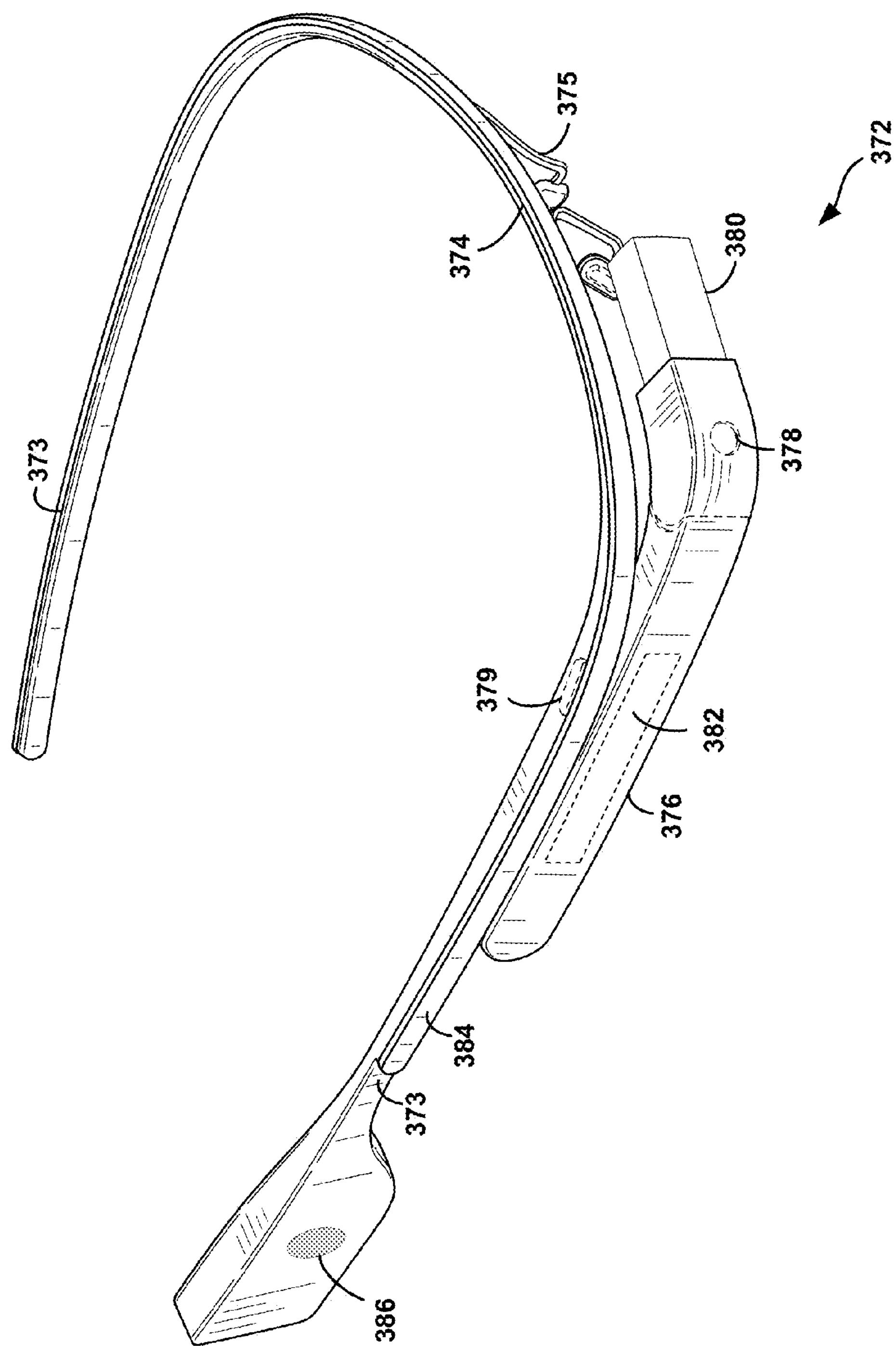
FIG. 3D illustrates another wearable computing system according to an example embodiment.

FIG. 3D illustrates another wearable computing system according to an example embodiment, which takes the form of a monocular HMD 372. The HMD 372 may include side-arms 373, a center frame support 374, and a bridge portion with nosepiece 375. In the example shown in FIG. 3D, the center frame support 374 connects the side-arms 373. The HMD 372 does not include lens-frames containing lens elements. The HMD 372 may additionally include a component housing 376, which may include an on-board computing system (not shown), an image capture device 378, and a button 379 for operating the image capture device 378 (and/or usable for other purposes). Component housing 376 may also include other electrical components and/or may be electrically connected to electrical components at other locations within or on the HMD. HMD 372 also includes a BCT 386.

The HMD 372 may include a single display 380, which may be coupled to one of the side-arms 373 via the component housing 376. In an example embodiment, the display 380 may be a see-through display, which is made of glass and/or another transparent or translucent material, such that the wearer can see their environment through the display 380. Further, the component housing 376 may include the light sources (not shown) for the display 380 and/or optical elements (not shown) to direct light from the light sources to the display 380. As such, display 380 may include optical features that direct light that is generated by such light sources towards the wearer's eye, when HMD 372 is being worn.

In a further aspect, HMD 372 may include a sliding feature 384, which may be used to adjust the length of the side-arms 373. Thus, sliding feature 384 may be used to adjust the fit of HMD 372. Further, an HMD may include other features that allow a wearer to adjust the fit of the HMD, without departing from the scope of the invention.

Figure 3E:
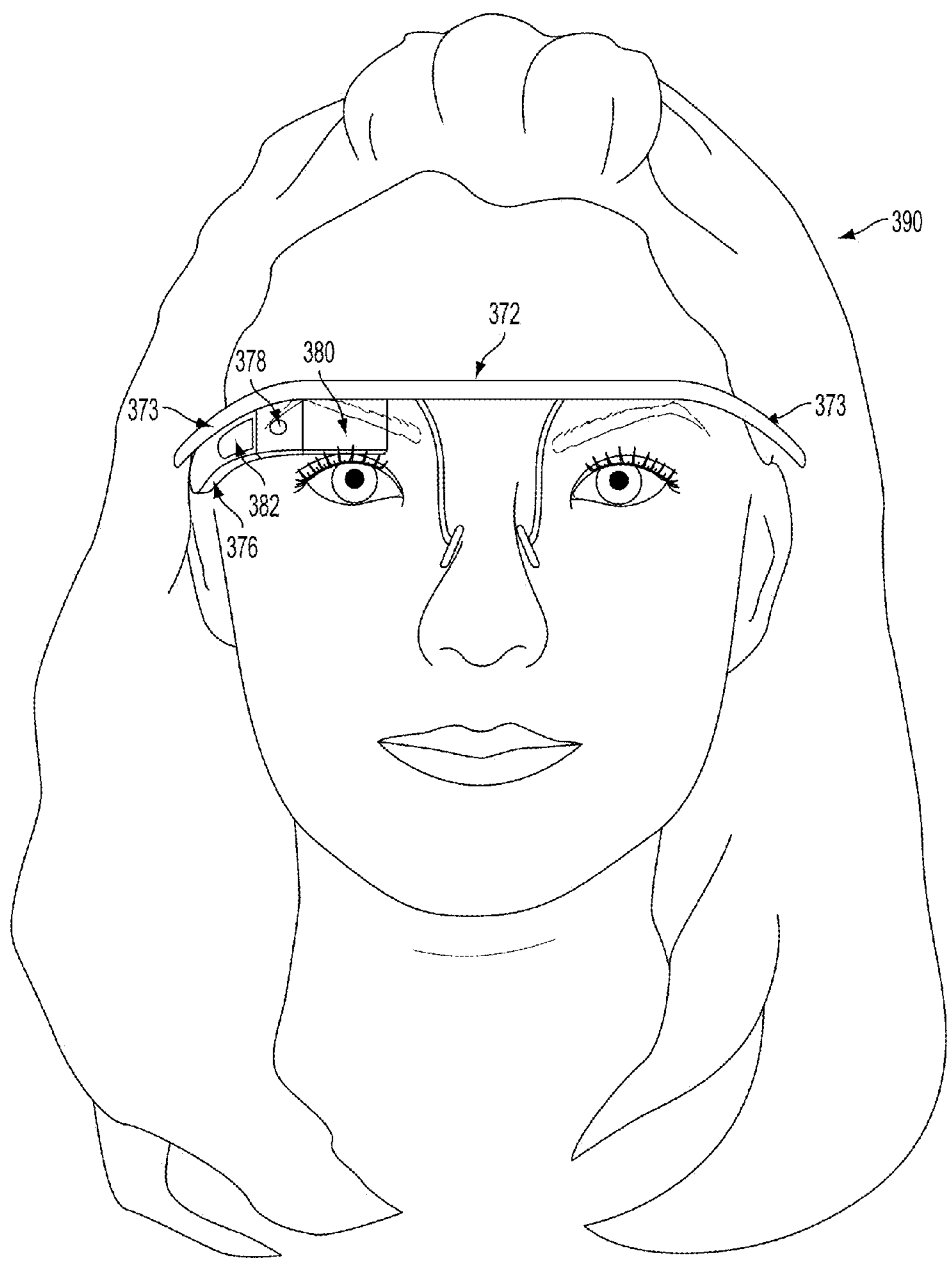
FIGS. 3E to 3G are simplified illustrations of the wearable computing system shown in FIG. 3D, being worn by a wearer.
Figure 3F:
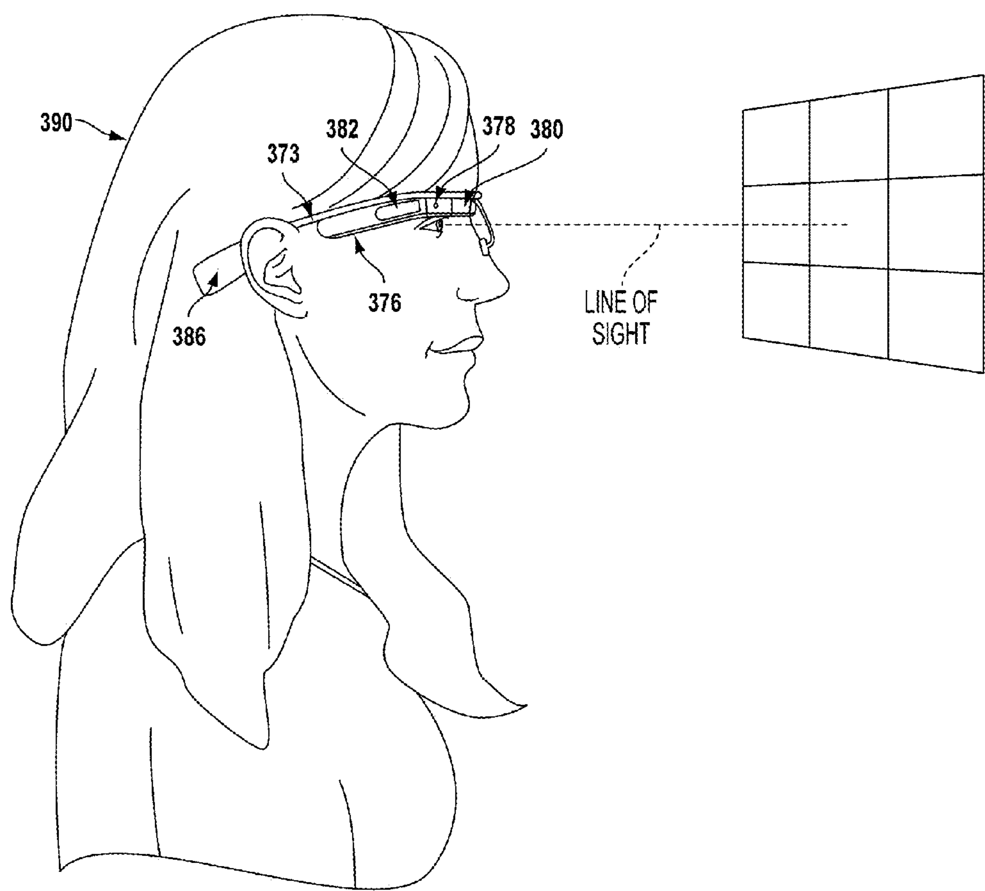
Figure 3G:
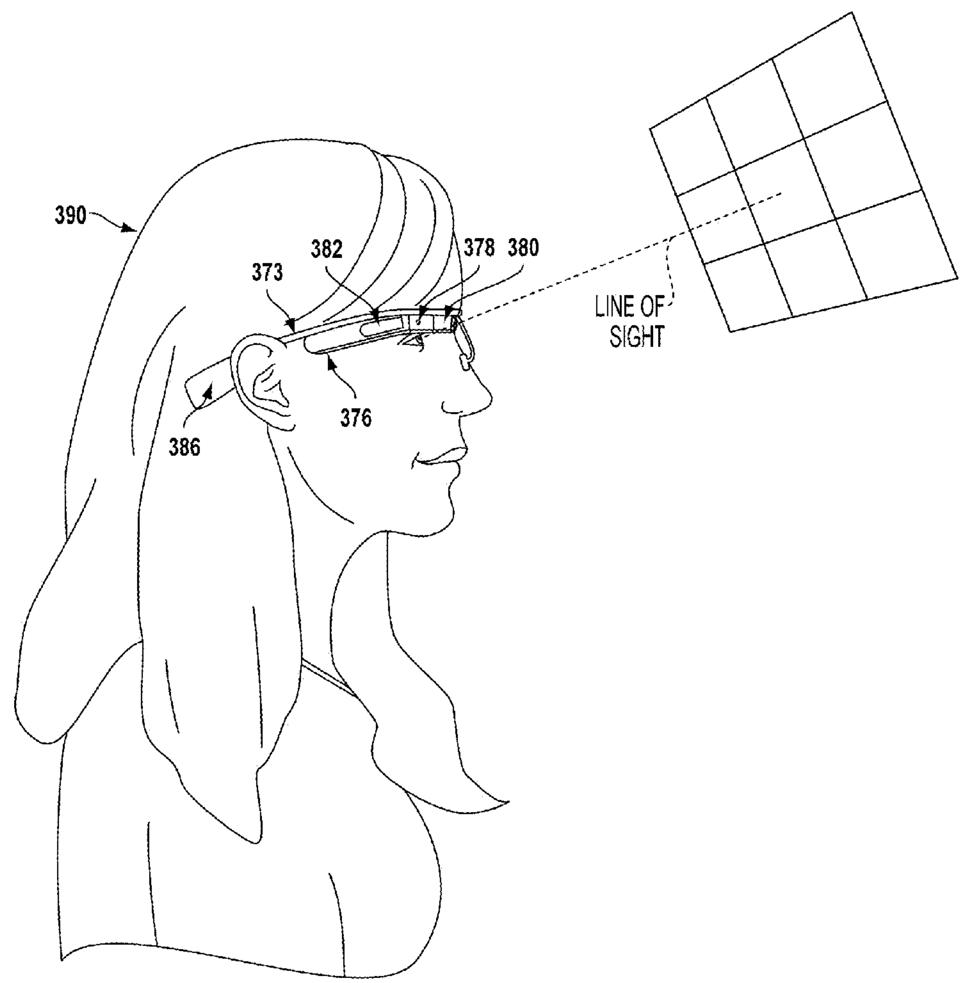

FIGS. 3E to 3G are simplified illustrations of the HMD 372 shown in FIG. 3D, being worn by a wearer 390. As shown in FIG. 3F, when HMD 372 is worn, BCT 386 is arranged such that when HMD 372 is worn, BCT 386 is located behind the wearer's ear. As such, BCT 386 is not visible from the perspective shown in FIG. 3E.

In the illustrated example, the display 380 may be arranged such that when HMD 372 is worn, display 380 is positioned in front of or proximate to a user's eye when the HMD 372 is worn by a user. For example, display 380 may be positioned below the center frame support and above the center of the wearer's eye, as shown in FIG. 3E. Further, in the illustrated configuration, display 380 may be offset from the center of the wearer's eye (e.g., so that the center of display 380 is positioned to the right and above of the center of the wearer's eye, from the wearer's perspective).

Configured as shown in FIGS. 3E to 3G, display 380 may be located in the periphery of the field of view of the wearer 390, when HMD 372 is worn. Thus, as shown by FIG. 3F, when the wearer 390 looks forward, the wearer 390 may see the display 380 with their peripheral vision. As a result, display 380 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 380 is located as shown, the wearer 390 may view the display 380 by, e.g., looking up with their eyes only (possibly without moving their head). This is illustrated as shown in FIG. 3G, where the wearer has moved their eyes to look up and align their line of sight with display 380. A wearer might also use the display by tilting their head down and aligning their eye with the display 380.

Figure 4:
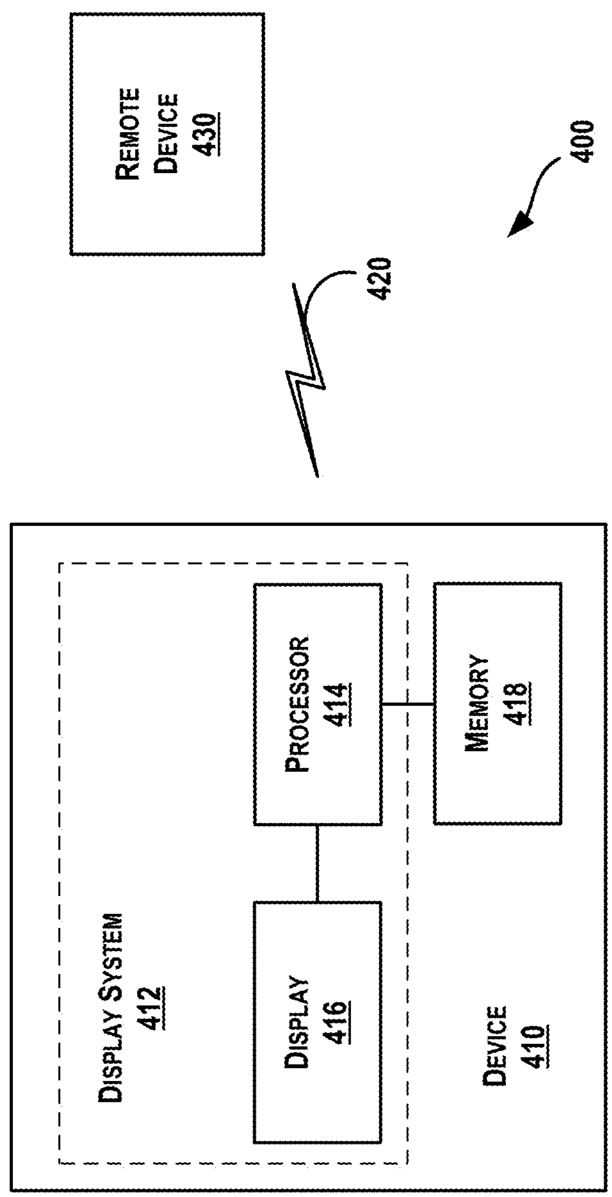
FIG. 4 is a simplified block diagram of a computing device according to an example embodiment.

FIG. 4 is a simplified block diagram a computing device 410 according to an example embodiment. In an example embodiment, device 410 communicates using a communication link 420 (e.g., a wired or wireless connection) to a remote device 430. The device 410 may be any type of device that can receive data and display information corresponding to or associated with the data. For example, the device 410 may take the form of or include a head-mountable display, such as the head-mounted devices 302, 352, or 372 that are described with reference to FIGS. 3A to 3G.

The device 410 may include a processor 414 and a display 416. The display 416 may be, for example, an optical see-through display, an optical see-around display, or a video see-through display. The processor 414 may receive data from the remote device 430, and configure the data for display on the display 416. The processor 414 may be any type of processor, such as a micro-processor or a digital signal processor, for example.

The device 410 may further include on-board data storage, such as memory 418 coupled to the processor 414. The memory 418 may store software that can be accessed and executed by the processor 414, for example.

The remote device 430 may be any type of computing device or transmitter including a laptop computer, a mobile telephone, head-mountable display, tablet computing device, etc., that is configured to transmit data to the device 410. The remote device 430 and the device 410 may contain hardware to enable the communication link 420, such as processors, transmitters, receivers, antennas, etc.

Further, remote device 430 may take the form of or be implemented in a computing system that is in communication with and configured to perform functions on behalf of client device, such as computing device 410. Such a remote device 430 may receive data from another computing device 410 (e.g., an HMD 302, 352, or 372 or a mobile phone), perform certain processing functions on behalf of the device 410, and then send the resulting data back to device 410. This functionality may be referred to as cloud computing.

In FIG. 4, the communication link 420 is illustrated as a wireless connection; however, wired connections may also be used. For example, the communication link 420 may be a wired serial bus such as a universal serial bus or a parallel bus. A wired connection may be a proprietary connection as well. The communication link 420 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 430 may be accessible via the Internet and may include a computing cluster associated with a particular web service (e.g., social-networking, photo sharing, address book, etc.).

IV. ILLUSTRATIVE METHODS

Figure 5:
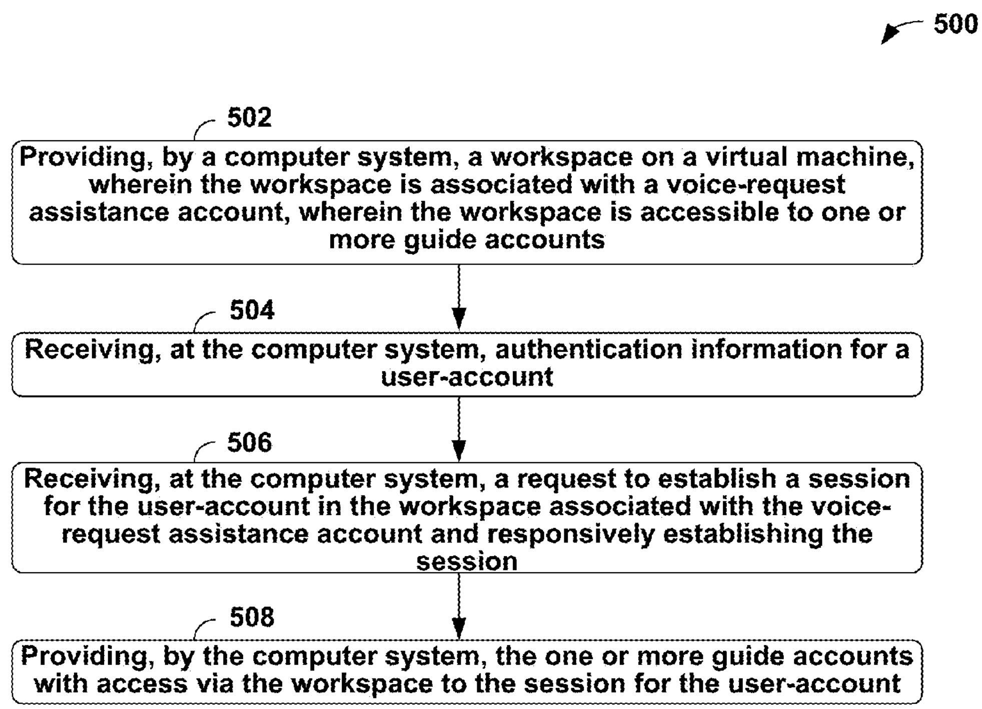
FIG. 5 is a flow chart illustrating a method, according to an example embodiment.

FIG. 5 is a flow chart illustrating a method 500, according to an example embodiment. Method 500 may be carried out to provide a workspace that is associated with a voice-request account and that may establish a session with the user-account to perform one or more actions associated with the user-account. Method 500 may be carried out by the hybrid response system as described above.

Method 500 involves a computing system providing a workspace on a virtual machine, where the workspace is associated with a voice-request account and where the workspace is accessible to one or more guide accounts, as shown by block 502. The computing system receives authentication information for a user-account, as shown by block 504. The computing system then receives a request to establish a session for the user-account in the workspace associated with the voice-request account and responsively establishes the session, as shown by block 506. The computing system then provides the one or more guide accounts with access via the workspace to the session for the user-account, as shown by block 508.

Example user-accounts may include e-mail service providers, online retailers, social networks, accounts with financial institutions or online reservation accounts (e.g., restaurants, hotels, airlines, rental cars, etc.), among other possibilities.

In some embodiments, the voice-request account may be a user-account that is associated with the hybrid response system such that the user may access the services provided by the hybrid response system.

In some embodiments, the method further involves the computing system executing, via the workspace, an action associated with the user-account. Examples of actions that may be associated with the user-account include making purchases of goods or services, making reservations, sending messages, posting photos, posting status updates, making payments, checking balances, pinning items of interest, taking actions on a social network, and/or posting to a micro-blog, among other possibilities. In general, any action that may be performed via a computing device with access to a user-account may be included.

In some embodiments, the method may further involve the computing system providing a notification that the action was executed. The notification that the action was executed may include one or more of sending an email confirmation, sending a text message confirmation, displaying a pop-up window in the workspace or displaying an icon, an image or a graphic in the workspace, among other possibilities.

In some embodiments, the authentication information for a user-account may include an OpenID or login credentials specific to the user-account. In some embodiments, the authentication information may be provided to the voice-request account via a browser extension, for example. Once the session for a user-account is established on the workspace, the session may remain open for a period of time, which may vary depending upon the settings in place at the website that hosts a particular user-account. For example, a user-account's host website may only permit a session or cookie to remain valid or open for one or more minutes, hours, days or months, etc. If a user's session times out or expires, a user may be prompted to reauthenticate the user-account to re-establish a session with the workspace. Alternatively, a user's login credentials for a given user-account may expire or be modified, which may terminate the session on the workspace associated with that user-account. Accordingly, a user may be prompted to provide updated authentication information to re-establish the session on the workspace.

In some embodiments, the computing device receives one or more permissions and/or restrictions associated with the user-account that are applied to the guide-account access via the workspace to the session for the user-account. The permissions and restrictions may grant the one or more guide accounts access to one or more types of data maintained on the user-account. Examples of types of data maintained on the user-account include photos or albums, posts, status updates, private messages, credit card information, personal profiles, past purchases, friends or contacts, financial information, among other possibilities.

In addition, the permissions and restrictions may grant the one or more guide accounts access to perform one or more actions associated with the user-account. For example, with the user's permission, the guide account may be able to post status updates on a social networking account but may be restricted from accessing a user's photos, contacts or messages associated with the same social networking account. In another example, with a user's permission, a guide account may be able to send emails from a user's email account, with a user's permission, but may be restricted from accessing the user's inbox, sent folder or other archived folders. In a further example, with a user's permission, a guide account may have access to past purchases and the ability to make additional purchases via a user-account with an online retailer but may be restricted from viewing stored credit card information associated with the same account. Alternatively, a user may grant a guide account full access to a user-account, such as an online restaurant reservation account. Further, in some embodiments, the computing system may send a user identification information for the guide account assigned to a particular voice request.

In some embodiments, a voice request may be randomly assigned to a specific guide account by the computing system. Alternatively, a user may request that a voice request be assigned to a specific guide account. A user's selection of a specific guide account may be based on past voice requests received and responded to by a certain guide account or based on ratings assigned to guide accounts from past users, among other possibilities. A user may further select a type of guide account (e.g., home, health, entertainment, finance, etc.), which the computing system will then use to assign the voice request to a guide account. Still further, a user may select a guide account based on a level of experience associated with a given guide account. Many other types of selection criteria may be utilized for a user to select a guide account or category of guide accounts to respond to a voice request.

In some embodiments, the method may further involve the computing system creating a log in response to establishing the session in the workspace. The log captures the actions of the guide that are made via the guide account. For example, the creation of the log may include capturing (a) image data of the workspace, (b) a video of the workspace, (c) screenshots of the workspace, (d) a text log, (e) key strokes and/or (f) mouse-initiated commands, among other possibilities. The log maintains a record for auditing purposes by the user or supervisors of the guide accounts in order to maintain the security and integrity of the system. The log may be provided in real-time or archived for later retrieval by the user or supervisors, for example.

In some embodiments, the user's computing device may receive a signal and responsively display a real-time stream of the workspace. The real-time display helps maintain data integrity and security of the system as a means for the user to audit the actions made via the guide account. Further, with the user's permission, the guide account may access a user's computing device, similar to a remote desktop, to carry out the requested action associated with the user-account. Alternatively, a user interface displayed to a user may be different than a user interface displayed on the workspace to the guide account. In this embodiment, the interface displayed to the user may be designed for ease of use on the front-end, while the user interface on the workspace may be designed for a trained back-end user of a guide account.

Figure 6:
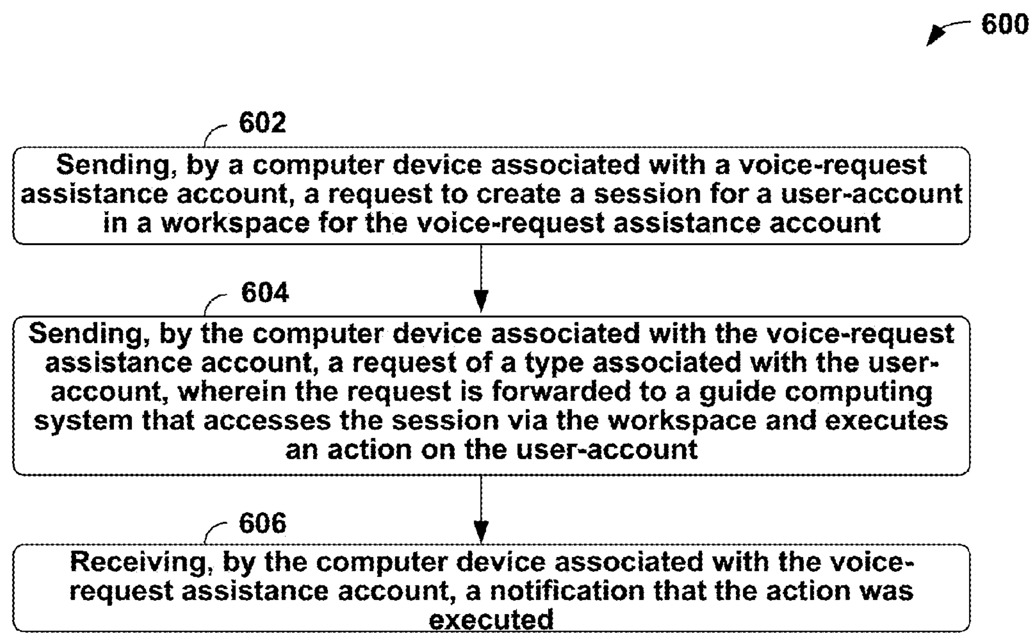
FIG. 6 is a flow chart illustrating a method, according to an example embodiment.

FIG. 6 is a flow chart illustrating a method 600, according to an example embodiment. Method 600 may be carried out to establish a session with the user-account to perform one or more actions associated with the user-account. For example, method 600 may be carried out by a client device such as an HMD, or a system therein (e.g., a processor and non-transitory computer readable medium with instructions that are executable to carry out the functionality described herein). Method 600 could also be carried out by other types of client devices, such as a mobile phone, tablet computer, or personal computer, among other possibilities.

Method 600 involves a computing device that is associated with a voice-request account sending a request to create a session for a user-account in a workspace for the voice-request account, as shown by block 602. The computing device associated with the voice-request account then sends a request associated with the user-account, where the request is forwarded to a guide computing system that accesses the session via the workspace and executes an action on the user-account, as shown by block 604. The computing device associated with the voice-request account then receives a notification that the action was executed, as shown by block 606.

Method 600 may be performed using the embodiments described with respect to method 600 above.

As discussed above, once a session is established on the workspace, the session will remain active unless the session times out or authentication information for a user-account becomes outdated. As such, a session for the user-account may be established on the workspace days, weeks, months, etc. before a voice request related to a particular user-account is sent by a computing device.

In some embodiments, method 600 may further involve the computing device receiving a signal and responsively displaying: (a) a real-time stream of the workspace or (b) a user interface that is different than a user interface displayed on the workspace, as described above.

In some embodiments, method 600 may further involve the computing device receiving a notification that the action was executed. The notification that the action was executed may include one or more of: receiving an email confirmation, receiving a text message confirmation, displaying a pop-up window on the computing device or displaying an icon, an image or a graphic on the computing device, among other possibilities.

In some embodiments, method 600 may further involve the computing device requesting a log of the session in the work space in response to receiving the notification that the action was executed. The log may include one or more of image data, a video, screenshots, a text log, key strokes or mouse-initiated commands, among other possibilities, as described above.

In some embodiments, method 600 may further involve the computing device setting one or more permissions associated with the user-account, where the one or more permissions are maintained via the voice-request account, as described above. The one or more permissions grant the guide computing system access (a) to one or more types of data maintained on the user-account and/or (b) to perform one or more actions associated with the user-account.

V. ILLUSTRATIVE APPLICATIONS

Figure 7:
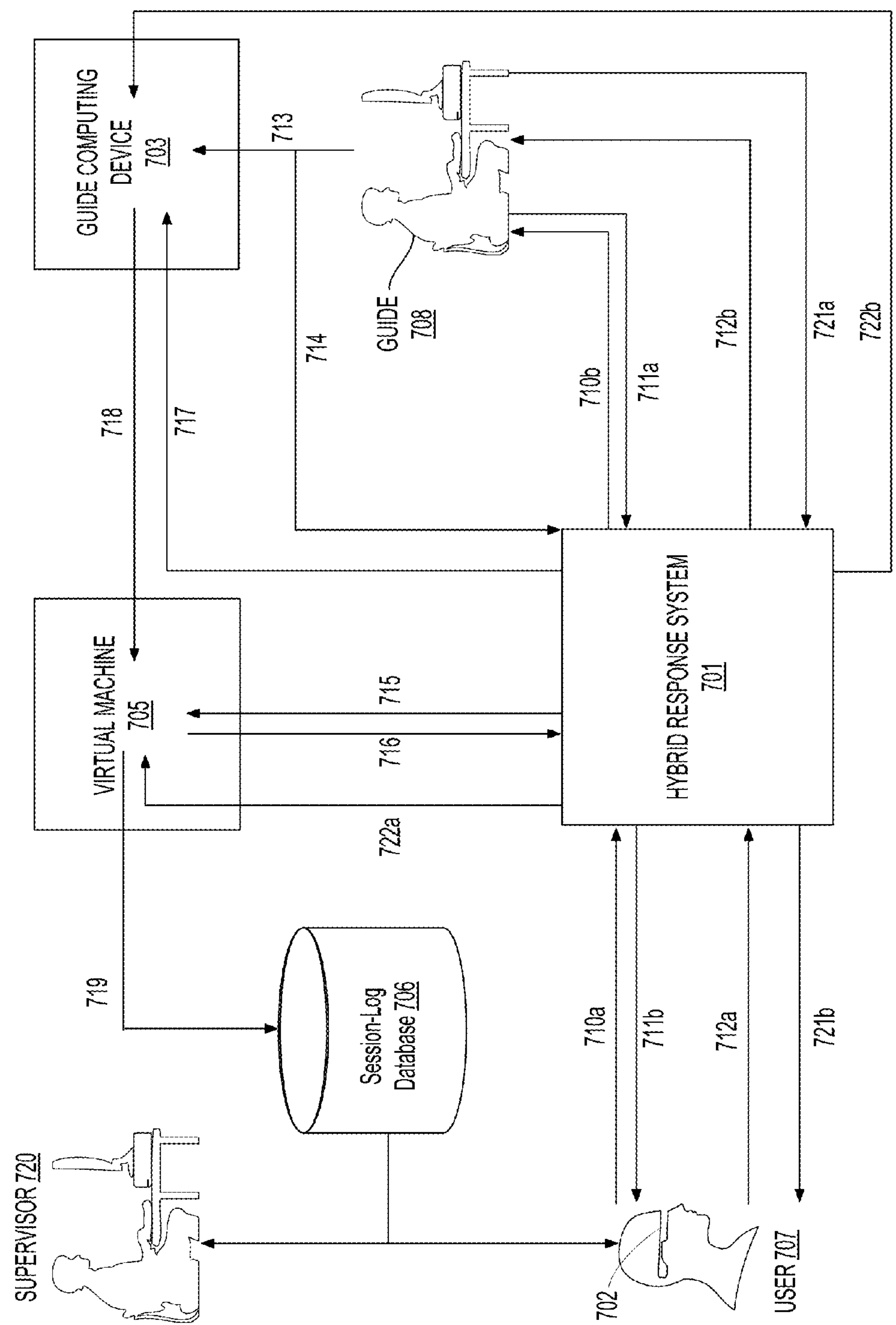
FIG. 7 is a block diagram illustrating components of a system, in accordance with an illustrative application of an example embodiment.

FIG. 7 is a block diagram illustrating components of a system 700, in accordance with an illustrative application of an example embodiment. System 700 includes a hybrid response system 701, a client device 702, a guide computing device 703 configured to provide access to a guide account, a virtual machine 705 configured to host a workspace, and a session-log database 706.

As discussed in the foregoing sections, a user may establish a session for one or more user-accounts by providing authentication data to a voice-request account associated with the hybrid response system. The user-account session is then established on the workspace of the virtual machine 705 and the user-account session may remain open on the workspace until authentication data times out. In addition, a guide account may access the workspace on the virtual machine 705 and may then further, with the user's permission, establish a guide account session with the user-account session on the workspace.

As shown in FIG. 7, client device 702 is an HMD configured to communicate with hybrid response system 701. In the illustrated embodiment, the client device 702 receives a voice request from a user 707, and the client device 702 responsively sends a voice request message 710*a* to the hybrid response system 705. The hybrid response system 701 then determines that human assistance is required to provide a response to the voice request and forwards a voice request message 710*b* to a guide computing device 703. The guide computing device 703 receives the voice request message 710*b*. The guide computing device 703 then receives, from the guide 708, an indication that access to a user-account is required in order to provide a response to the voice request. The guide computing device 703 responsively sends a message 711*a* requesting access to the user-account via the workspace on the virtual machine 705, where the request for access is associated with the guide account. The hybrid response system 701 receives the message 711*a* and then sends message 711*b* to the client device 702, message 711*b* requesting access to the user-account via the workspace on the virtual machine 705. In other alternative embodiments, the message 711*a* requesting access to the user-account via the workspace may be sent directly from the guide computing device 703 to the client device 702.

In response to the message 711*b*, the client device 702 receives input from the user 707, where the input includes the user's permission to grant the guide account access to the user-account via the workspace on the virtual machine 705. The input may comprise a speech segment or non-speech input including, for example, tapping a touchpad, performing a head gesture or eye movement (e.g. a wink) to confirm permission, among other possibilities. The client device 702 then forwards a message 712*a* to the hybrid response system 701, message 712*a* including the user's permission to grant the guide account access to the user-account via the workspace on the virtual machine 705. The guide computing device 703 then receives a message 712*b* from the hybrid response system 701, message 712*b* including the user's permission to grant the guide account access to the user-account via the workspace on the virtual machine 705.

Next the guide computing device 703 receives authentication data 713 from the guide 708 in order to login to the workspace on the virtual machine 705. The guide computing device 703 sends a message 714 to the hybrid response system 701, message 714 indicating the voice-request account associated with the user 707 that sent the voice request message 710*a*, in order to initialize a guide account session on the workspace of the virtual machine 705. The hybrid response system 701 then responsively sends a message 715 to the virtual machine 705, message 715 including a guide-ID associated with the guide account in order to access a pre-established session for the user-account on the workspace. The virtual machine 705 responsively sends a message 716 to the hybrid response system 701, message 716 including an access code. The guide computing device 703 receives a message 717 from the hybrid response system 701, message 717 including the access code.

The guide computing device 703 sends a message 718 to the virtual machine 705, message 718 including the access code. A guide-account session is then established granting the guide account access to the pre-established a user-account session or sessions that are open on the workspace of the virtual machine 705. The guide 708, via the guide account on the guide computing device 703, may perform an action or gather information via the user-account on the workspace in response to the voice request. After the guide computing device 703 has completed the requested action or has obtained information requested by the user 707, the guide computing system 703 sends a message 721*a* to hybrid response system 701, which includes a response to the voice request message. The hybrid response system 701 sends message 721*b* to client device 702, message 721*b* including a response to the voice request message. In response to receiving message 721*a*, the hybrid response system sends message 722*a* to the virtual machine 705, message 722*a* including data that causes termination of the guide-account session with the pre-established session for the user-account on the workspace. The guide computing device 703 likewise receives message 722*b* from the hybrid response system 701, message 722*b* including data that causes termination of the guide-account session with the pre-established user-account session on the workspace. In an alternative embodiment, the guide account session may be left open on the workspace.

In addition, in an optional embodiment, the virtual machine 705 sends a message 719 to the session-log database 706, message 719 including a log of the guide-account session on the workspace. User 707 or a guide-account supervisor 720 may access the log of the guide-account session, via the session-log database, to audit the guide's performance, for example. The log may be viewed in real-time during the guide-account session or after the guide-account session has been terminated.

Figure 8:
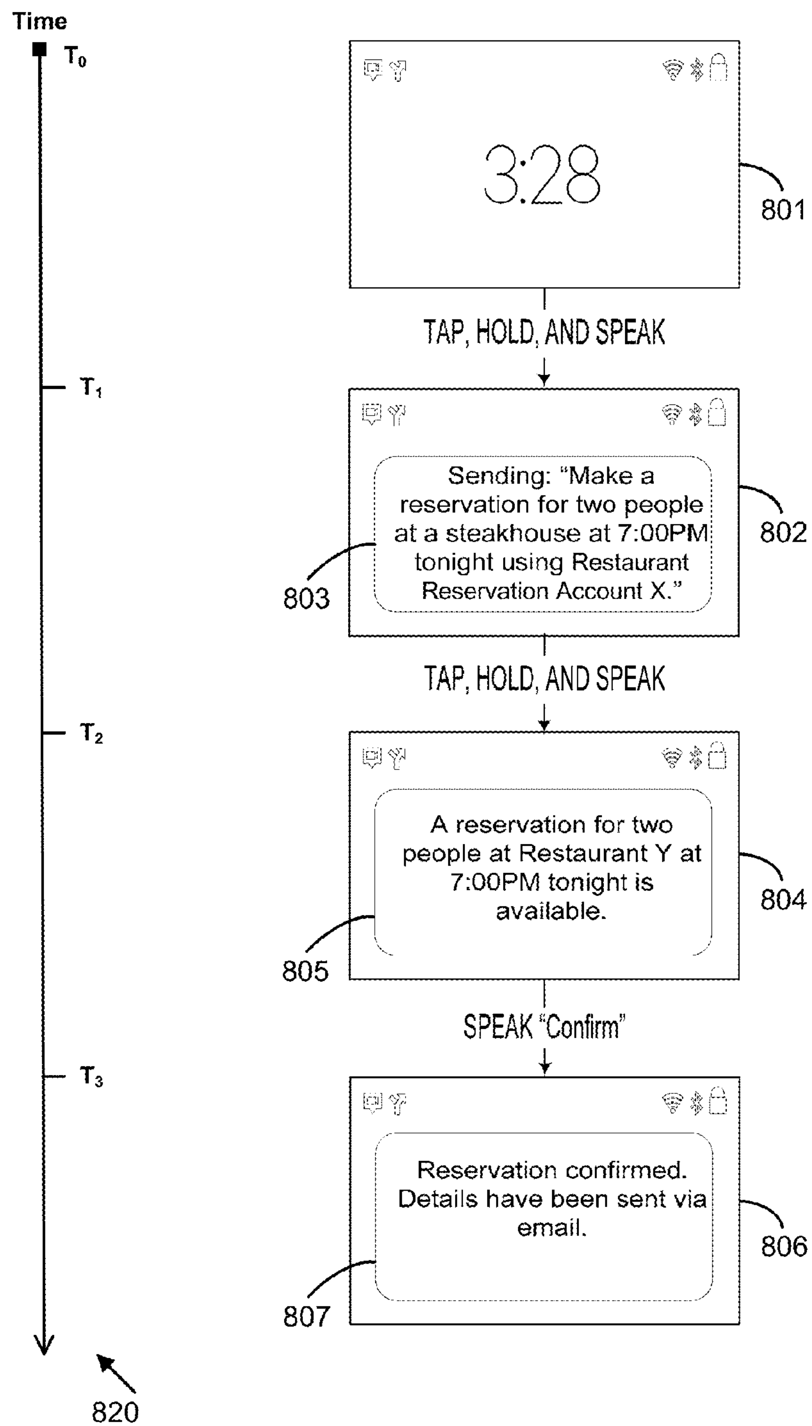
FIG. 8 is an illustration of screens from an HMD display, in accordance with an illustrative application of an example embodiment.

FIG. 8 is an illustration of screens from an HMD display, in accordance with an illustrative application of an example embodiment. In particular, FIG. 8 illustrates another scenario where an HMD user sends a first speech segment or voice request to a hybrid response system. Note that the screens 801, 802, 804, and 806 may be representative of screen shots, and may appear in the order that they might occur, in accordance with an example embodiment. As such, the approximate times $T_0$ to $T_3$ at which each screen 801, 802, 804, and 806 might be displayed is indicated on a timeline 820.

As shown at time $T_0$, the HMD may display a home screen 801. Further at time $T_0$, a user has previously established a session on a workspace for a specific user account, namely Restaurant Reservation Account X, by providing authentication information for the user account to a voice-request account associated with the HMD. The user's authentication information may have been provided to the voice-request account via a browser extension, for example, on the HMD or a different computing device.

At time $T_1$, an HMD user may initiate a voice request from the home screen 801 by tapping and holding a touchpad on the HMD, and then speaking the voice request to perform an action on the user-account. In the scenario illustrated in FIG. 8, the voice request is: "Make a reservation for two people at a steakhouse at 7:00 PM tonight using Restaurant Reservation Account X." When this voice request is received by the HMD, the HMD may apply a speech-to-text process to the voice request. The HMD may then display an initial request card 803, which includes a transcription of the spoken voice request (e.g., the literal transcription of the spoken words), along with an indication that the request is being sent to the hybrid response system. Thus, as shown at time $T_1$, the HMD may display a screen 802 with an initial request card 803 that indicates: "Sending: 'Make a reservation for two people at a steakhouse at 7:00 PM tonight using Restaurant Reservation Account X.'"

As further shown in FIG. 8, the HMD may receive a response to the voice request from a hybrid response system and, at time $T_2$, may display a screen 804 with a response card 805. In the illustrated example, response card 805 indicates: "A reservation for two people at Restaurant Y at 7:00 PM tonight is available." In this example, a user speaks "Confirm," sending a response approving the proposed reservation to the hybrid response system. In some embodiments, it is also possible that one or more additional inputs, such as a response from the user to a request for further information from the hybrid response system, may be provided in order to execute the requested action.

As further shown in FIG. 8, the HMD may receive a confirmation from the hybrid response system and, at time $T_3$, may display a screen 806 with a confirmation card 807. In the illustrated example, response card 807 indicates: "Reservation confirmed. Details have been sent via email."

Other example applications of exemplary methods include establishing a user-account session on the workspace for a user-account associated with a calendar app, a reminder app or a music app, among other possibilities. With respect to a reminder app or a calendar app, a user may provide voice requests for a reminder, including "Remember to read book entitled X," "Add item Y to my grocery list," "Remember to buy item Z," "Remind me to call Mom on Tuesday," "Put pick up kids from school on my to-do list for Thursday," for example. A guide-account session may then be responsively established with the reminder- or calendar-app user-account session with the workspace and a reminder may be added via the reminder- or calendar-app user-account. The reminder may then be provided on the user's computing device(s) associated with the voice-request account.

With respect to a music app, a user may provide voice requests that include "Stream playlist X," "Download album Y," "Play some mid-90's hip-hop," "Play song A," "Purchase new single B," "Upload CD titled C," or "Store soundtrack D," for example. A guide-account session may then be responsively established with the music-app user-account on the workspace, and the requested action may be performed via the music-app user-account. The response to the request may then be sent to the user's computing device associated with the voice-request account, such that playlist X is streamed to the user's computing device, for example.

VI. CONCLUSION

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

We claim:

1. A computer implemented method, comprising:

providing, by a computing system, a workspace on a virtual machine, wherein the workspace is associated with a voice-request account;

receiving, at the computing system, user-account authentication information for a user account;

receiving, at the computing system, a user-account session request to establish a user-account session for the user account in the workspace and responsively causing the user-account session to be established in the workspace according to the user-account authentication information;

receiving, at the computing system, from a client device, a user-account request relating to the user-account session;

sending, from the computing system, the user-account request to a guide account at a guide computing system;

receiving, at the computing system, from the client device, permission for the guide account to access the user-account session in the workspace;

providing, by the computing system, the guide account with the permission from the client device to access the user-account session in the workspace;

receiving, at the computing system, a guide-account session request from the guide account to establish a guide-account session for the guide account in the workspace; and providing, by the computing system, the guide account with access to establish the guide-account session in the workspace, the guide-account session allowing the guide account to further access the user-account session in the workspace and to respond to the user-account request.

2. The computer implemented method of claim 1, wherein the guide account responds to the user-account request by executing via the workspace an action associated with the user account.

3. The computer implemented method of claim 2, further comprising:

providing, by the computing system, a notification that the action was executed.

4. The computer implemented method of claim 3, wherein providing a notification that the action was executed comprises one or more of:

(a) sending an email confirmation, (b) sending a text message confirmation, (c) displaying a pop-up window in the workspace, or (d) displaying an icon, an image or a graphic in the workspace.

5. The computer implemented method of claim 1, further comprising:

creating, at the computing system, a log in response to establishing the session in the workspace.

6. The computer implemented method of claim 5, wherein creating the log comprises capturing one or more of image data of the workspace, a video of the workspace, screenshots of the workspace, a text log, key strokes or mouse-initiated commands.

7. The computer implemented method of claim 1, wherein the user-account authentication information comprises an OpenID or login credentials specific to the user account.

8. The computer implemented method of claim 1, further comprising:

receiving, at the computing device, one or more permissions or restrictions associated with the user account that are applied to the guide-account access via the workspace to the session for the user account.

9. The computer implemented method of claim 8, wherein the one or more permissions grant the guide account access (a) to one or more types of data maintained on the user account or (b) to perform one or more actions associated with the user account.

10. The computer implemented method of claim 1, wherein the computing system comprises a hybrid response system.

11. The computer implemented method of claim 1, wherein the computing system receives the guide-account session request from the guide account in response to guide account authentication information received by the guide account.

12. A computer implemented method comprising:

sending, by a client device associated with a voice-request account, user-account authentication information for a user-account;

sending, by the client device, a user-account session request to a computing system to create a user-account session for the user account in a workspace for the voice-request account according to the user-account authentication information;

sending, by the client device, to the computing system, a user-account request associated with the user-account, wherein the user-account request is forwarded by the computing system to a guide account at a guide computing system;

sending, by the client device, to the computing system, permission for the guide account to access the user-account session in the workspace, wherein the permission is forwarded by the computing system to the guide account;

receiving, by the client device, a notification that the guide account has responded to the user-account request by: sending a guide-account session request to the computing system; establishing the guide-account session in the workspace; and using the guide-account session to access the user-account session in the workspace.

13. The computer implemented method of claim 12, further comprising:

receiving a signal and responsively displaying, by the client device:

(a) a real-time stream of the workspace; or (b) a user interface that is different than a user interface displayed on the workspace.

14. The computer implemented method of claim 12, wherein receiving a notification that the action was executed comprises one or more of:

(a) receiving an email confirmation, (b) receiving a text message confirmation, (c) displaying a pop-up window on the client device, or (d) displaying an icon, an image or a graphic on the client device.

15. The computer implemented method of claim 12, further comprising:

requesting, by the client device, a log of the session in the workspace in response to receiving the notification that the action was executed.

16. The computer implemented method of claim 15, wherein the log comprises one or more of image data, a video, screenshots, a text log, key strokes, or mouse-initiated commands.

17. The computer implemented method of claim 12, further comprising:

setting, by the client device, one or more permissions associated with the user account, wherein the one or more permissions are maintained via the voice-request account.

18. The computer implemented method of claim 17, wherein the one or more permissions grant the guide account access (a) to one or more types of data maintained on the user account or (b) to perform one or more actions associated with the user account.

19. A non-transitory computer readable medium configured to store program instructions that, when executed by a processor, cause the processor to carry out functions comprising:

providing, by a computing system, a workspace on a virtual machine, wherein the workspace is associated with a voice-request account;

receiving, at the computing system, user-account authentication information for a user account;

receiving, at the computing system, a user-account session request to establish a user-account session for the user account in the workspace and responsively causing the user-account session to be established in the workspace according to the user-account authentication information;

receiving, at the computing system, from a client device, a user-account request relating to the user-account session;

sending, from the computing system, the user-account request to a guide account at a guide computing system;

receiving, at the computing system, from the client device, permission for the guide account to access the user-account session in the workspace;

providing, by the computing system, the guide account with the permission from the client device to access the user-account session in the workspace;

receiving, at the computing system, a guide-account session request from the guide account to establish a guide-account session for the guide account in the workspace; and providing, by the computing system, the guide account with access to establish the guide-account session in the workspace, the guide-account session allowing the guide account to further access the user-account session in the workspace and to respond to the user-account request.

20. The non-transitory computer readable medium of claim 19, wherein the computing system receives the guide-account session request from the guide account in response to guide account authentication information received by the guide account.

21. A system, comprising:

a response computing system communicatively coupled to a client device and configured to:

provide a workspace on a virtual machine;

receive user-account authentication information for a user account; and receive a user-account session request to establish a user-account session for the user account in the workspace and responsively cause the user-account session to be established in the workspace according to the user-account authentication information; and a guide computing system communicatively coupled to the response computing system, the guide computing system providing a guide account, wherein the response computing system is further configured to:

receive, from the client device, a user-account request relating to the user-account session;

send the user-account request to the guide account at the guide computing system;

receive, from the client device, permission for the guide account to access the user-account session in the workspace;

provide the guide account with the permission from the client device to access the user-account session in the workspace;

receive a guide-account session request from the guide account to establish a guide-account session for the guide account in the workspace; and provide the guide account with access to establish the guide-account session in the workspace, the guide-account session allowing the guide account to further access the user-account session in the workspace and to respond to the user-account request.

22. The system of claim 21, wherein the guide account responds to the user-account request by executing via the workspace an action associated with the user account.

23. The system of claim 21, wherein the response computing system is further configured to receive the guide-account session request from the guide account in response to guide account authentication information received by the guide account.

* * * * *